United States Patent [19]
Moore

[11] Patent Number: 6,051,302
[45] Date of Patent: Apr. 18, 2000

[54] THRUST REVERSER INNER WALL

[75] Inventor: Francis W. Moore, Seattle, Wash.

[73] Assignee: The Boeing Company, Seattle, Wash.

[21] Appl. No.: 08/910,574

[22] Filed: Aug. 1, 1997

Related U.S. Application Data

[62] Division of application No. 09/111,834, Jul. 28, 1995, which is a continuation of application No. 07/926,444, Aug. 10, 1992, abandoned.

[51] Int. Cl.[7] ..................................................... B32B 17/00
[52] U.S. Cl. ......................... 428/116; 428/118; 60/226.2; 239/265.19; 244/110 B
[58] Field of Search .................................. 428/116, 118; 60/226.2; 239/265.19; 244/110 B

[56] References Cited

U.S. PATENT DOCUMENTS

| | | | |
|---|---|---|---|
| 4,052,523 | 10/1977 | Rhodes et al. | 428/116 |
| 4,235,303 | 11/1980 | Dhoore et al. | 428/116 X |
| 4,249,974 | 2/1981 | Wilson | 428/116 X |
| 4,257,998 | 3/1981 | Diepenbrock, Jr. et al. | 428/116 X |
| 4,265,955 | 5/1981 | Harp et al. | 428/116 |
| 4,280,926 | 7/1981 | Abe et al. | 428/116 X |
| 4,421,201 | 12/1983 | Nelsen et al. | 428/116 X |
| 4,495,764 | 1/1985 | Gnagy | 428/116 X |
| 4,533,098 | 8/1985 | Bonini et al. | 428/116 X |
| 4,539,244 | 9/1985 | Beggs | 428/116 |
| 4,578,303 | 3/1986 | Kundinger et al. | 428/116 |
| 4,600,619 | 7/1986 | Chee et al. | 428/118 |
| 4,618,463 | 10/1986 | Uemura et al. | 428/394 X |
| 4,833,029 | 5/1989 | Dupont et al. | 428/116 |
| 5,111,359 | 5/1992 | Montesano | 361/709 |
| 5,288,537 | 2/1994 | Corden | 428/116 |
| 5,466,507 | 11/1995 | Darfler . | |
| 5,470,633 | 11/1995 | Darfler . | |
| 5,498,462 | 3/1996 | Darfler | 428/116 |

FOREIGN PATENT DOCUMENTS

| | | | |
|---|---|---|---|
| 3625534 | 2/1988 | Germany . | |
| 4053736 | 2/1992 | Japan | 428/116 |
| 2019983 | 11/1979 | United Kingdom . | |
| 82/00974 | 4/1982 | WIPO . | |
| 85/03032 | 7/1985 | WIPO . | |
| 88/04707 | 6/1988 | WIPO . | |

*Primary Examiner*—Timothy M. Speer
*Attorney, Agent, or Firm*—John C. Hammar

[57] ABSTRACT

Thrust reverser inner wall structure comprising a thermally conductive nonmetallic carbon pitch fiber honeycomb core sandwiched between a top and bottom layer. The core is adhered by a reticulated layer of adhesive to a perforated carbon fiber top layer, and adhered to a base layer of nonmetallic, nonperforated carbon fiber reinforced fabric.

12 Claims, 1 Drawing Sheet

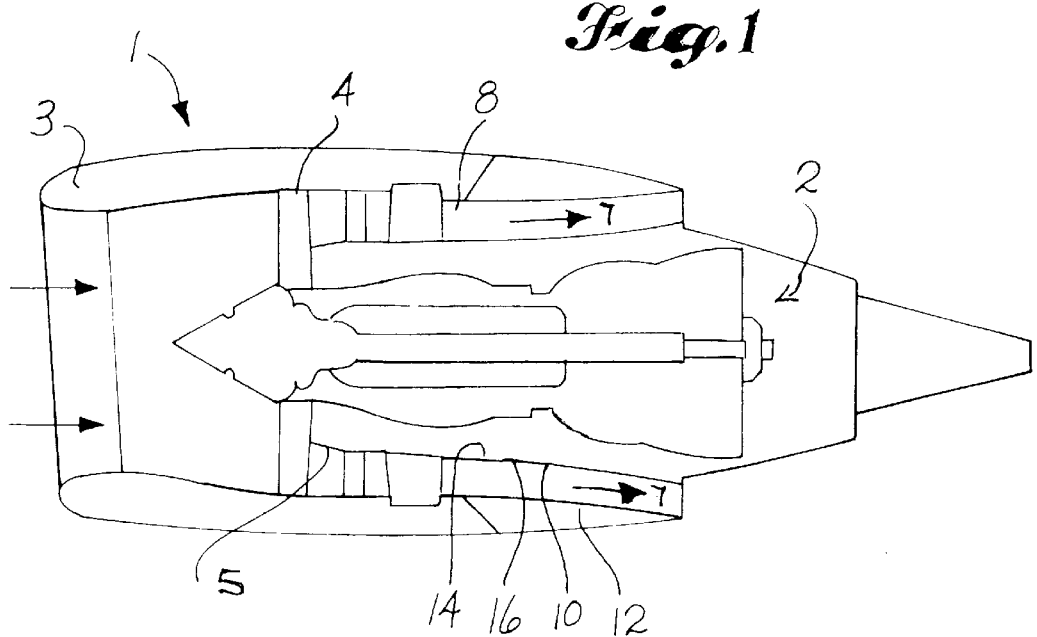
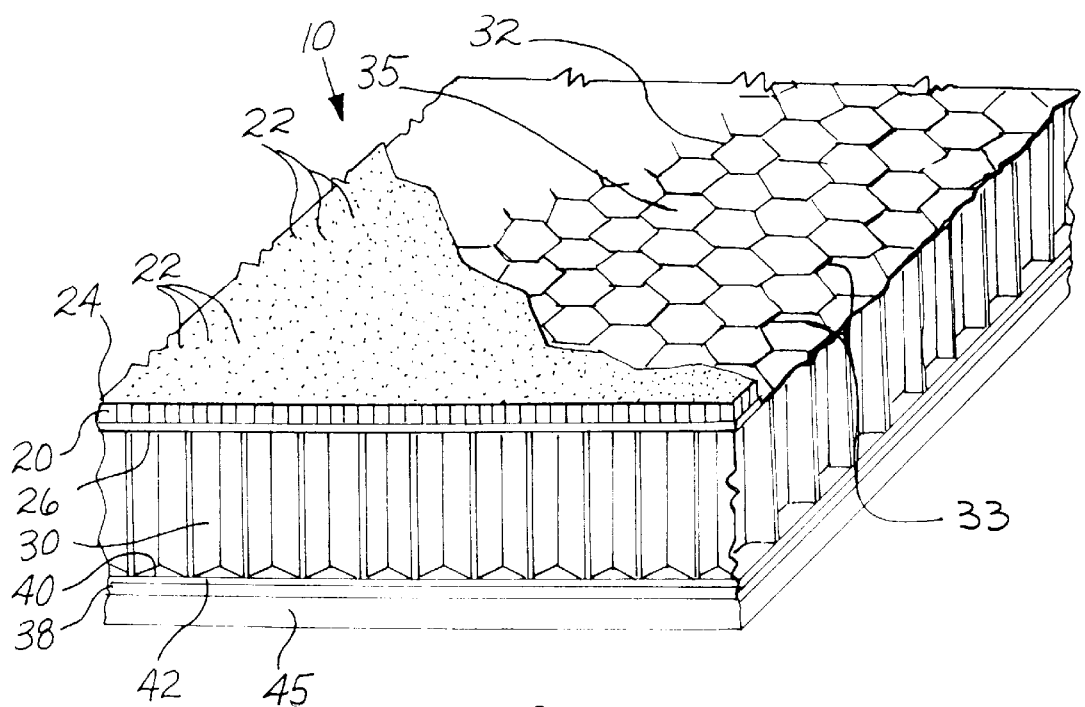

6,051,302

THRUST REVERSER INNER WALL

REFERENCE TO RELATED APPLICATIONS

The present application is a divisional application based upon U.S. patent application 09/111,834, filed Jul. 28, 1995, which was a file wrapper continuation application based on U.S. patent application 07/926,444, filed Aug. 10, 1992, now abandoned.

BACKGROUND OF THE INVENTION

A typical commercial airplane gas turbine engine includes a thrust reverser cowling nacelle. The nacelle structure consists of an inner and outer cowl joined with bifurcations. The engine fan airstream runs through the annular cavity between the two cowls. The inner cowl or wall covers the engine case, accessories, and ducting installed therein. Because the engine case is very hot, up to 1100 degrees F., the inside surface of the inner cowl, referred to as the thrust reverser inner wall, is exposed to high radiative energy.

Thrust reverser inner wall structures have generally been made with aluminum skin, an aluminum honeycomb core, and a layer of applied insulation on the hot surface adjacent to the engine case. This metallic thrust reverser inner wall has been effective in conducting heat away from the engine to the surface adjacent to the fan airstream. A metallic structure is heavy, resulting in a significant weight penalty. In addition, the aluminum is susceptible to corrosion damage.

To reduce the weight penalty and improve acoustic characteristics, the thrust reverser inner wall has been built with an aluminum honeycomb core sandwiched between carbon fiber layers. As a result of the carbon fibers adjacent to the aluminum core, the wall structure has been susceptible to galvanic corrosion, particularly in the presence of moisture. Such corrosion creates a potential for subsequent structural failure of the aluminum core that is not acceptable.

SUMMARY OF THE INVENTION

Accordingly, the present invention provides a thrust reverser inner wall structure that substantially reduces the weight penalty realized, avoids susceptibility to corrosion, maintains the strength of the wall, and maintains adequate thermal conductivity, thereby reducing the need for insulation.

In accordance with the subject invention, a thrust reverser wall is a sandwich structure with a top layer of epoxy impregnated perforated carbon fiber fabric, a non-metallic, composite honeycomb core, and a bottom layer of epoxy impregnated carbon fiber fabric without perforations. The non-metallic honeycomb core is made with pitch based carbon fibers to achieve the necessary thermal conductivity. The wall's high level of thermal conductivity is such that the engine heat is conveyed to the perforated carbon fiber top layer. Engine fan air passing over the top layer acts as a heat sink wherein enough heat is carried away from the engine to minimize the need for insulation on the engine side of the wall.

These advantages of the present invention will be more clearly understood from the detailed description of the preferred embodiment that follows taken in conjunction with the features shown in the attached drawings.

BRIEF DESCRIPTION OF THE DRAWINGS

FIG. 1 is a cross section of a typical commercial aircraft jet power plant.

FIG. 2 is an isometric cut away view of the subject non-metallic thrust reverser inner wall.

DETAILED DESCRIPTION OF THE PREFERRED EMBODIMENT

As seen in FIG. 1, a typical commercial aircraft jet power plant 1 comprise the engine 2, associated cowling 3, fan 4, and thrust reverser cowling 5. The fan 4 draws air through the power plant 1 as indicated by the fan air flow arrows 7. The fan air flow enters cowling 3 and passes through the annular fan air bypass duct 8 between the thrust reverser inner wall 10 and the thrust reverser outer wall 12.

While the power plant 1 is operating, the engine 2 generates a substantial amount of heat and reaches up to 1100 degrees F. The inside surface 14 of the thrust reverser inner wall 10 is directly exposed to the high radiative energy. To reduce the need for insulation (not shown) on the inside surface 14, the subject thrust reverser inner wall 10 is designed to conduct the heat away from the engine 2, through the thrust reverser inner wall 10 to the relatively cold outer surface 16 of the thrust reverser inner wall 10. The cold fan air flow 7 passing over the outer surface 16 acts as a heat sink. As such, high thermal conductivity of thrust reverser inner wall 10 results in less insulation and smaller weight penalties.

Weight penalties associated with the thrust reverser inner wall 10 are also substantially reduced by utilizing composite materials for the honeycomb core rather than aluminum or other metals. The thrust reverser inner wall 10 of the subject invention, as described below, maintains high thermal conductivity while utilizing all non-metallic components.

As seen in FIG. 2, thrust reverser inner wall 10 is a sandwich structure with a top layer 20 of perforated carbon fiber reinforced epoxy. Perforations 22 are manufactured into the top layer 20 when the layer is partially cured on a perforation layup tool (not shown). The perforations 22 are designed to maintain proper acoustic properties of the thrust reverser inner wall 10. When installed in the power plant 1, the top face 24 of perforated carbon fiber top layer 20 directly interfaces with the fan air flow 7.

A layer of reticulated adhesive 26 adheres the perforated carbon fiber top layer 20 to a thermally conductive non-metallic carbon pitch fiber honeycomb core 30. In the preferred embodiment, adhesive layer 26 comprises BMS 5-137 Structural Adhesive for Acoustic Panels as defined in The Boeing Company specification BAC 5514-5137.

Thermally conductive non-metallic impregnated carbon pitch fiber honeycomb core 30 consists of impregnated fabric reinforced sheets 32, corrugated to form specific honeycomb cells 35, then bonded with a polyimide adhesive resin 33 and coated with a polyimide resin (now show) in accordance with The Boeing Company specification BMS 8-339. The carbon pitch fiber honeycomb core 30 has thermal conductivity ranging from 1.09–2.05 W/m–°K., and preferably, at least about 1.9 W/m–°K. at least about 2.05 W/m–°K. thereby reducing the weight penalty associated with a resulting thick insulation layer.

The carbon pitch fiber honeycomb core 30 in the preferred embodiment, as specified in The Boeing Company specification BMS 8-339, is manufactured by Hexcel Corporation, Graham, Tex., as part numbers HFT-GP-327. Compared to an aluminum honeycomb core, the Hexcel carbon pitch fiber honeycomb core 30 material reduces the weight penalty by 26% and is not susceptible to corrosion.

A base layer 38 of non-metallic, nonperforated carbon fiber reinforced fabric is adhered to the bottom surface 40 of carbon pitch fiber honeycomb core 30 by a layer of adhesive 42. In the preferred embodiment, the adhesive used is BMS 8-245 Adhesive for Composite Bonding, as defined by The Boeing Company specification BMS 8-245.

A suitable adhesive meeting this BMS 8-245 specification is a high bond strength thermosetting resin such as a modified epoxy and polyimide block copolymer resin. These resins are normally cured to bonding strength at temperatures between about 250 and 350° F. Examples of such are PL-729-300 sold by the B.F. Goodrich Chemical Company, AF-453 sold by the 3M Company, and BASF Structural Materials Co.'s Metlbond™ series of adhesive films. These adhesives are sold in sheet form with densities of about 0.03 to 0.12 lbs. per square foot, and have a thickness of about 0.005 inches or greater.

The thrust reverser inner wall 10 sandwich structure described above is fabricated in accordance with The Boeing Company specification BAC 5317-6.

The preferred embodiment of the thrust reverser inner wall 10 has an insulation layer 45 adhered to the bottom of base layer 38, wherein the insulation layer is the layer adjacent and closest to the engine 2 when installed in the power plant.

While a particular embodiment of the invention has been described, it will be apparent to persons skilled in the art to which this invention pertains that many modifications and variations thereto are possible without departing from the spirit and scope of the invention.

Accordingly, the scope of this invention should be considered limited only by the spirit and scope of the elements of the appended claims or their reasonable equivalents.

We claim:

1. A corrosion-free thrust reverser inner wall for a jet engine, the engine having a hot engine housing and a surrounding annular duct for cold airflow, the inner wall being adapted for exposure up to 1100° F. being adapted to be free from corrosion, being laminated and having in order, (a) a first layer of resin impregnated carbon fabric; (b) a first layer of adhesive adjacent one side of the fabric; (c) a non-metallic, thermally conductive honeycomb core having adequate thermal conductivity so that engine fan air passing over the inner wall carries away sufficient heat from the engine to the surrounding annular duct to minimize the need for insulation on the engine side of the inner wall, the cell walls of the honeycomb being reinforced with pitch-based carbon fibers; (d) a second layer of reticulated adhesive on the honeycomb core; and (e) a sound reducing layer of perforated, resin impregnated carbon fabric adjacent to the second layer of adhesive adapted to maintain proper acoustic properties, the laminated layers defining a composite sandwich panel having a thermally conductive honeycomb core.

2. The thrust reverser inner wall of claim 1 wherein the first layer and the perforated carbon fabric of the sound reducing layer are impregnated with epoxy resin.

3. The thrust reverser inner wall of claim 1 wherein the honeycomb core is lighter than an aluminum honeycomb core of similar thickness and is not susceptible to corrosion.

4. The thrust reverser inner wall of claim 3 wherein the pitch based carbon fibers conduct heat through the inner wall and wherein the core has a thermal conductivity in the range from 1.90–2.05 W/m–°K.

5. The thrust reverser inner wall of claim 1 wherein the thermal conductivity of the core is at least about 1.90–2.05 W/M–°K.

6. The thrust reverser inner wall of claim 1 further comprising a layer of insulation on the carbon fabric on a side of the fabric opposite the core.

7. A rust reverser inner wall for a jet engine adapted for exposure to temperatures up to 1100° F., the engine having a hot engine housing and a surrounding annular duct for cold airflow, the inner wall being laminated, and having, in order, (a) a first layer of epoxy impregnated carbon fabric defining a composite skin of the inner wall; (b) a first layer of adhesive adjacent to one side of the skin; (c) a non-metallic, corrosion-free, high thermal conductivity honeycomb core bonded to the skin through the first layer of adhesive, the cells of the honeycomb including pitch based carbon fiber in a polyimide resin, the cells being bonded together with polyimide adhesive; (d) a second layer of adhesive reticulated to the honeycomb core; and (e) a sound reducing layer of perforated, epoxy impregnated carbon fabric adapted to maintain proper acoustic; properties forming a closeout skin attached to the core through the second layer of adhesive; wherein the pitch based carbon fibers in the core provide a thermal conductivity of the wall adequate for the wall to conduct heat away from the engine housing to the surrounding duct to minimize the need for insulation on the engine side of the inner wall.

8. The thrust reverser inner wall of claim 7 wherein the thermal conductivity of the wall is at least about 1.90–2.05 W/m –°K.

9. The thrust reverser inner wall of claim 7 further comprising a layer of insulation on the first layer of fabric.

10. A power plant for an aircraft comprising a jet engine surrounded by a cowling to define a fan bypass duct, wherein a thrust reverser of the engine is located to affect airflow in the duct, the thrust reverser having an inner wall adjacent to the engine, the inner wall including (a) a first layer of resin impregnated carbon fabric adjacent the bypass duct; (b) a non-metallic honeycomb core adhesively bonded to the first layer, the cell walls of the honeycomb core being reinforced with pitch based carbon fibers for conducting heat through the core from the engine to the bypass duct; and (c) a sound reducing layer of perforated,.resin impregnated carbon fabric adhesively bonded to the honeycomb core, wherein the thermal conductivity of the inner wall is adequate for the pitch based carbon fibers to conduct heat away from the engine to the fan bypass duct.

11. The power plant of claim 10 wherein the thermal conductivity of the core is in the range from 1.90–2.05 W/m–°K and the honeycomb core is lighter than an aluminum honeycomb core having similar thickness.

12. A composite, acoustic sandwich panel suitable for use as a thrust reverser inner wall in a jet engine for a commercial transport aircraft in which the inner wall is positioned between a fan bypass duct and the engine, the panel comprising:

(a) an imperforate composite skin having fiber-reinforced epoxy resin for positioning closest to the engine;

(b) a non-metallic, corrosion-resistant honeycomb core adhesively bonded to one side of the skin, the core having pitch based carbon fibers for conducting heat through the panel from the engine to the duct;

(c) a perforated, fiber-reinforced, epoxy, closeout skin adhesively bonded to the core to form sandwich panel, the perforations reducing sound transmission through the panel to achieve desired acoustic properties; and (d) insulation adhered to the imperforate skin between the engine and the skin, wherein the core has a thermal conductivity in the range from 1.9–2.05 W/m–°K. through the pitch based carbon fibers.

* * * * *